July 31, 1956

R. L. CHAMBERLIN ET AL 2,756,842

ELECTROSTATIC GAS CLEANING METHOD

Filed Aug. 27, 1954

INVENTOR
RALPH L. CHAMBERLIN
CARL W. T. HEDBERG

BY Harold T. Stowell

ATTORNEY

July 31, 1956

R. L. CHAMBERLIN ET AL 2,756,842

ELECTROSTATIC GAS CLEANING METHOD

Filed Aug. 27, 1954

INVENTOR
RALPH L. CHAMBERLIN
CARL W. J. HEDBERG

BY Harold T. Stowell

ATTORNEY

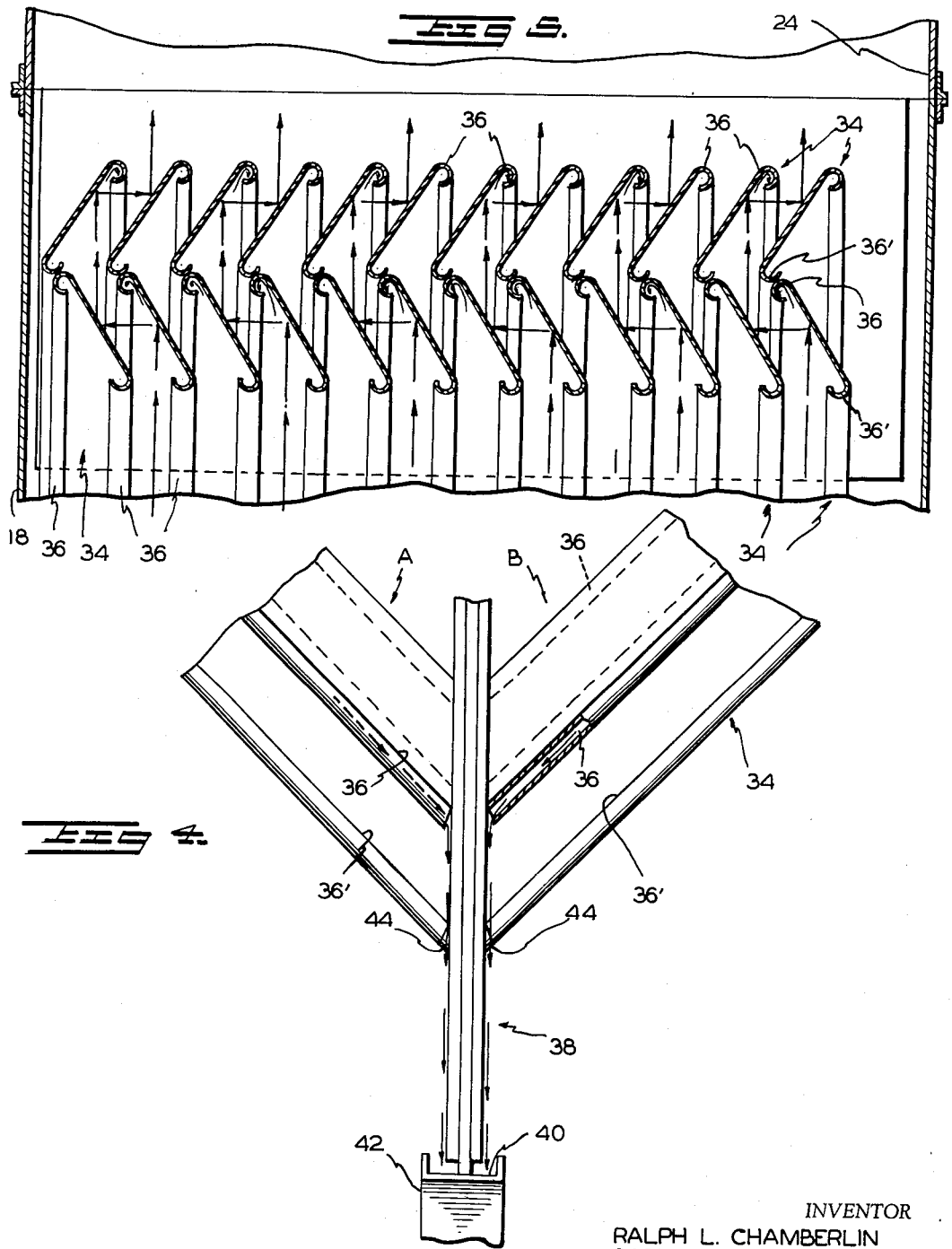

United States Patent Office 2,756,842
Patented July 31, 1956

2,756,842

ELECTROSTATIC GAS CLEANING METHOD

Ralph L. Chamberlin and Carl W. J. Hedberg, Bound Brook, N. J., assignors to Research Corporation, New York, N. Y., a corporation of New York Application August 27, 1954, Serial No. 452,536

3 Claims. (Cl. 183—122)

This invention relates to new methods for separating water particles from a gas stream containing suspended particulate material and a subsequent treatment of the water depleted gas stream in an electrostatic precipitator, and more particularly to such methods for the treatment of fume escaping from metal scarfing operations.

Gases issuing from metal scarfing machines contain large quantities of finely divided water droplets in addition to fume. The finely divided water particles originate from the water sprays used in conjunction with the normal scarfing operation and the subsequent cleaning of the scarfed plates. Attempts to separate the suspended particulate material from such gas streams in electrostatic precipitators have not been entirely satisfactory due to the high percentage of entrained water. It has been found that due to these large quantities of water the material collected was too wet to be rapped from the collecting and discharge electrodes and too dry to flow off as a sludge.

It has been found, however, that very satisfactory dry fume collection can be obtained in dry type electrostatic precipitators by mechanically eliminating substantial portions of the entrained water particles in the gas stream prior to the electrostatic treatment.

It is therefore a primary object of the present invention to provide new methods for treatment of gases issuing from metal scarfing operations whereby the fume may be collected in a dry type electrostatic precipitator.

A further object of the present invention is to provide such methods which are relatively simple in operation, highly efficient, and relatively inexpensive in operation. These and other objects and advantages of the present invention are provided by the method of cleaning gases issuing from metal scarfing operations which generally comprises passing such gases through means for mechanically removing entrained water particles from the gas stream and then passing the water depleted gas stream through a dry type electrostatic precipitator.

The methods of the present invention will be more particularly described in reference to the accompanying drawings wherein;

Fig. 4 is an enlarged fragmentary section substantially on line 4—4 of Fig. 3; and Fig. 5 is an enlarged fragmentary view of the water eliminator shown in Figs. 2 through 4 to show more clearly the flow path of the gases therethrough.

Figure 1:
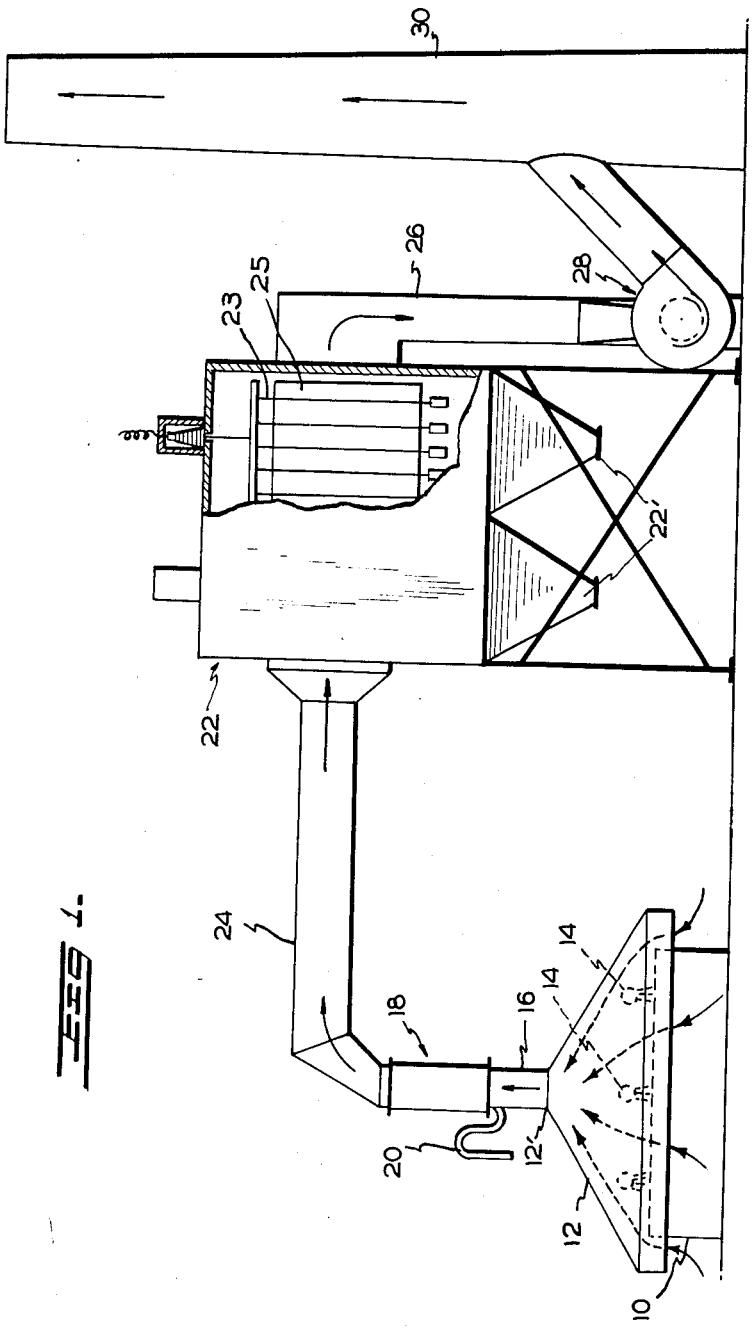
Fig. 1 is a diagrammatic view in elevation of a system for cleaning gases issuing from a metal scarfing machine.
Figure 2:
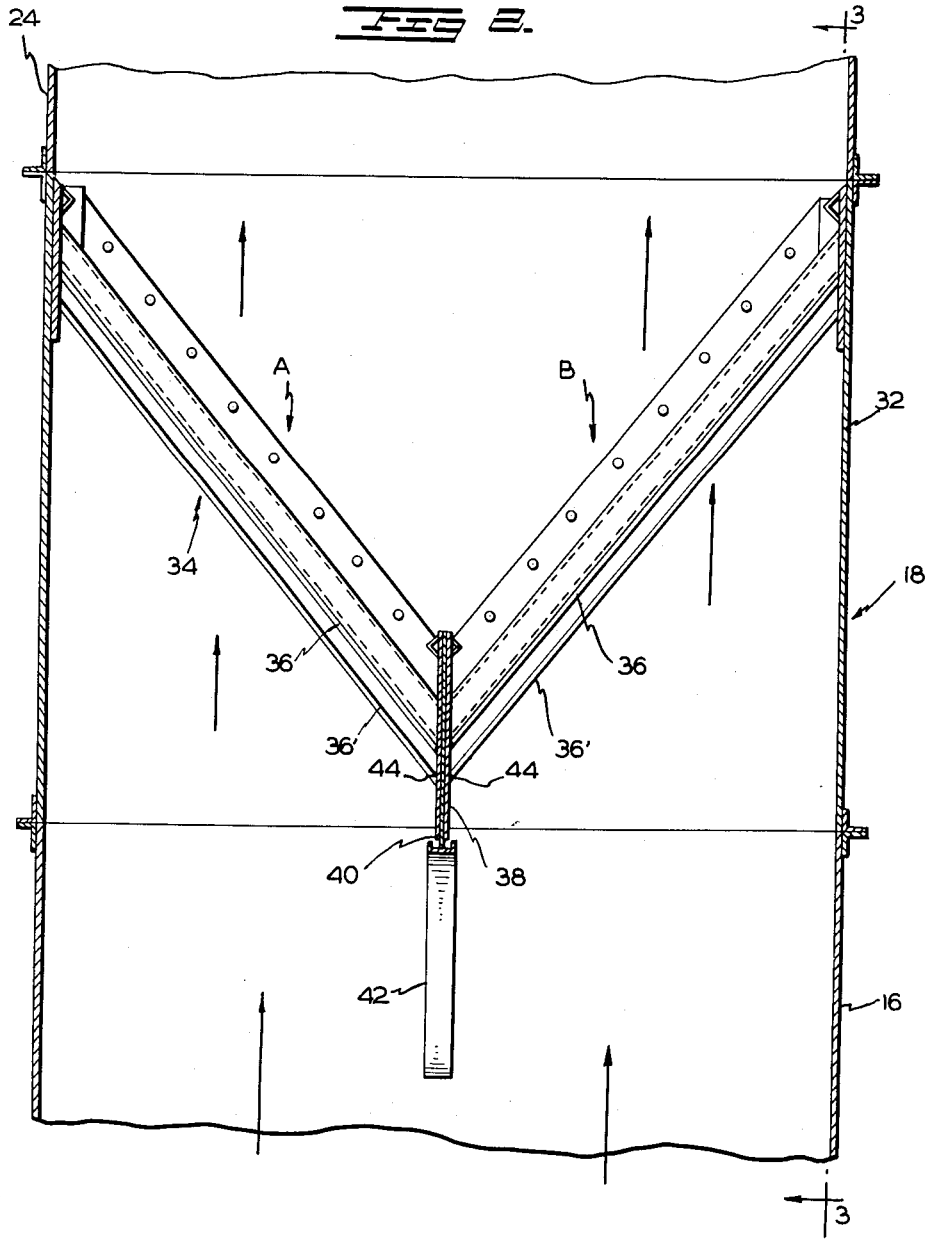
Fig. 2 is a vertical sectional view of one form of the water separator of the system shown in Fig. 1.
Figure 3:
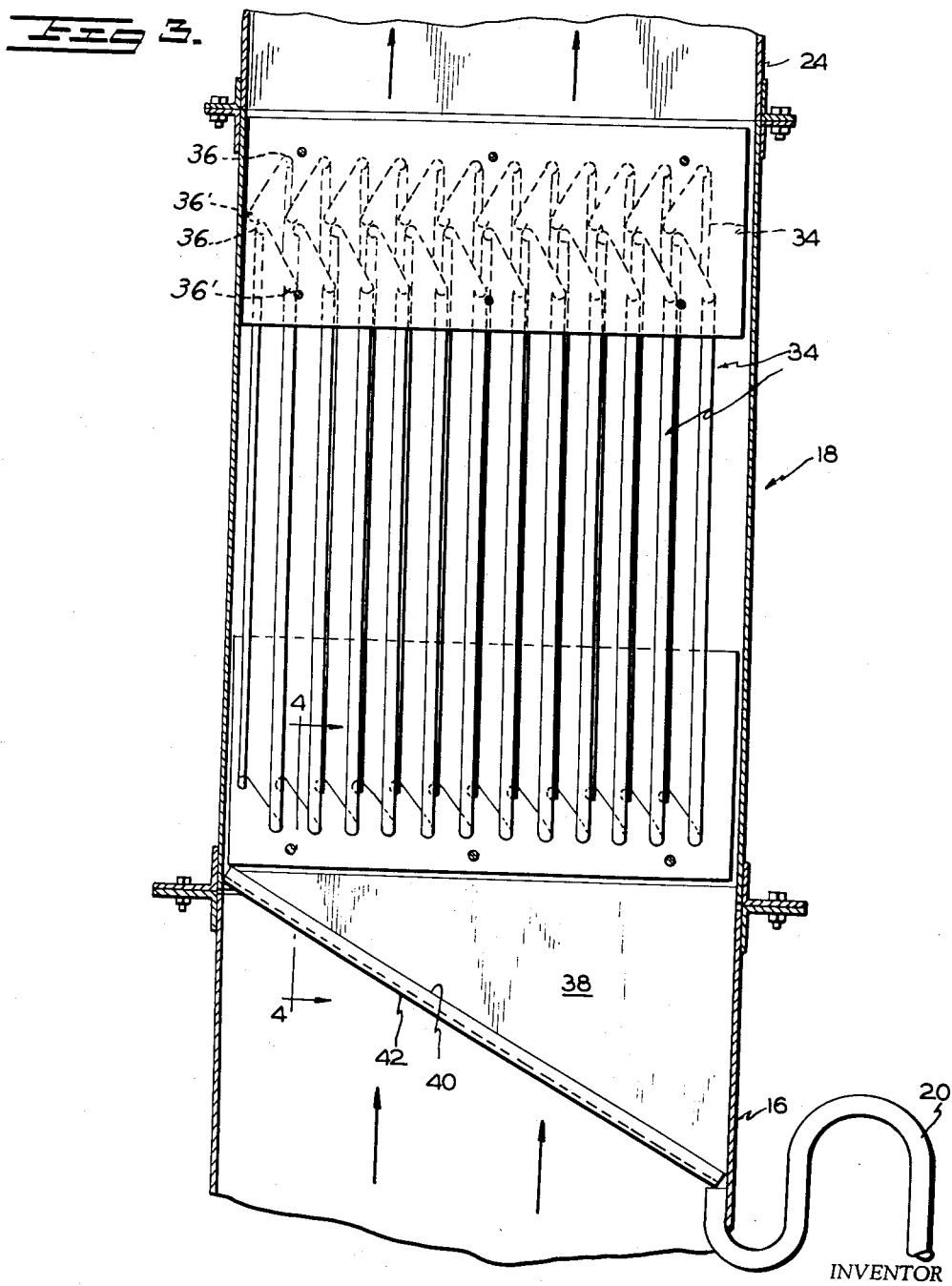
Fig. 3 is a section substantially on line 3—3 of Fig. 2.

Referring to Fig. 1 of the illustrated embodiments of the invention, 10 designates a metal scarfing machine provided with a fume removal hood 12. Within the hood are provided a plurality of water sprays generally designated 14 which provide the water necessary in the operation of the scarfing machine, and for the cleaning of the scarfed plates. A large portion of the water from the sprays 14 is turned into steam and fine droplets of water which are entrained in the gas stream withdrawn from the conical top portion 12' of the hood 12.

The gas withdrawn from the top portion 12' of the hood 12 containing the suspended fume, steam, and fine droplets of water is directed by conduit 16 through a mechanical water eliminator generally designated 18. The water eliminator 18 may be provided with a constant level water drain 20.

The gas stream containing the fume and substantially depleted of water passes from the eliminator 18 to a standard dry type electrostatic precipitator generally designated 22 having discharge and collecting electrodes 23 and 25 respectively through conduit 24.

The electrostatic precipitator 22 may be of any standard dry type such as, for example, the plate type precipitator shown in Fig. 1 of the H. A. Wintermute Patent. No. 2,601,906 issued July 1, 1950.

The clean gas stream leaves the electrostatic precipitator through conduit 26 whereupon it may be discharged into the atmosphere as shown in Fig. 1 after passing through exhaust fan or blower 28 and exhaust stack 30.

Details of a preferred method of eliminating water droplets from the gas stream prior to its passage through the electrostatic precipitator is shown in detail in Figs. 2 through 5.

The spray eliminator 18 generally comprises a casing 32 within which are supported a plurality of elongated plate members 34. Each of the longitudinal side edges of the plate members 34 are softly rolled inwardly to form substantially U-shaped hooks or passages 36 and 36'. The plates 34 with the rolled edges are arranged in pairs as to be more fully described hereinafter and secured within the casing 32 to provide two sections arranged at an angle of about 40° to the horizontal. The two sections are generally designated A and B and are separated by a partition member 38 provided with sloping bottom edge 40 as more clearly shown in Fig. 3 of the drawings. A substantially U-shaped channel member 42 is secured along the bottom edge 40 of the partition member 38 such as by welding, and the lower end thereof connects to water outlet 20.

Each section A and B of the hook type water eliminator comprises a plurality of pairs of plates 34 spaced from each other to provide a tortuous gas passage between the plates of each pair.

Referring in particular to Fig. 5 of the drawings it will be seen that each pair of plates 34 is arranged in a substantially V-form with the outer surfaces of the softly rolled edges thereof in reverse abutting arrangement. Thus the outer surface of the rolled edge 36 abuts the outer surface of the roll edge 36' of the complementary plate of each pair.

Observing the flow of gas through the water eliminator, as shown by the directional arrows, it will be seen that the leading hooks or rolled edges 36' are primarily for stiffening purposes, to establish an orifice opening and to prevent water particles from being re-entrained after they are picked up by the plates 34. The U-shaped hooks 36, however, are adapted to collect the water particles which leave the gas stream as it impinges at an angle against the surface of the plates.

As the individual water particles, which are separated from the gas stream as it passes between the angularly disposed plates 34, are collected in the U-shaped members 36' they flow down the plates to the partition member 38, down the partition members 38 to the U-shaped trough 42 and thence out the constant level drain 20.

In order to facilitate the drainage of entrapped water from within the U-shaped hooks 36' onto the plate 38 the lower edges of each hook is cut away as at 44, as more clearly shown in Fig. 4.

In operation of the system shown in the accompanying drawings slabs of material are fed into the apparatus 10 where the scarfing operation takes place and then pass under sprays 14 where the slabs of metal are cooled and all scale, shot pellets and the like are washed away. The gases carrying entrained water particles, steam, and fume are removed upwardly through conduit 16 into the water eliminator 18. The gas stream entering the water eliminator is divided into two portions which pass in parallel through zones A and B. As the gas streams pass between the opposed plates 34 the water particles are thrown out and trapped in the hook like channels 36.

The substantially water particle depleted gas stream containing the substantially dry fume is then drawn through the dry type electrical precipitator 22 by exhaust fan 28. In the electrical precipitator 22 the gas stream is subjected to high voltage corona-discharge electrostatic fields wherein the suspended particulate material is agglomerated and collected in a dry state upon the extended surface collecting electrodes where it may be readily removed by conventional rapping apparatus and collected in hoppers 22' positioned at the lower end of the precipitator. The clean gases then pass, for example, to atmosphere through stack 30.

As hereinbefore described the water particles removed from the gas stream in the eliminator 18 flow down the hook-like channels 36 to the partition member 38 down the outside surfaces thereof the sloping channel member 40. At the lower end of channel member 40 the water is withdrawn through drain pipe 20.

It has been found on installations employing water eliminators as hereinbefore described that very satisfactory results are obtained with gas velocity of about 35 ft. per second.

In the illustrated system of the invention the fume in gases issuing from the scarfing machine is withdrawn by means of a hood positioned above the machine. However, it will be apparent that the system and the method of the present invention will function equally well when the fume and gases are withdrawn in a downwardly direction whereby the upper surface of the scarfing machine is unobstructed by a hood, and other forms of water eliminators than that specifically shown may be utilized in the methods of the present invention.

We claim:

1. A method of dry collection of fume issuing from metal scarfing operation which comprises drawing a stream of air past a metal scarfing machine to suspend the fume and water particles issuing therefrom, passing the gas stream carrying the suspended water particles and fume through a mechanical water particle separator, to remove substantially all of the suspended water particles, and then subjecting the substantially water particle depleted gas stream to a high voltage electrostatic field whereby the fume is agglomerated and collected in a substantially dry state.

2. The method of dry collecting fume issuing from a metal scarfing machine comprising drawing a stream of air across a metal scarfing machine to suspend the fume and water particles therein, passing the gas stream carrying the suspended water particles and fume through a mechanical water eliminator at a velocity of about 35 feet per second to remove substantially all of the suspended water particles, and thereafter subjecting the substantially water particle depleted gas stream to a high voltage electrostatic field whereby the fume is agglomerated and collected in a substantially dry state.

3. The method of dry collecting fume issuing from a metal scarfing machine as defined in claim 2 wherein the high voltage electrostatic field is established between opposed discharge electrodes and extended surface collecting electrodes.

References Cited in the file of this patent
UNITED STATES PATENTS

| | | |
|---|---|---|
| 2,218,141 | Adams et al. | Oct. 15, 1940 |
| 2,677,439 | Hedberg | May 4, 1954 |
| 2,678,616 | Kay | May 18, 1954 |